United States Patent Office 3,076,003
Patented Jan. 29, 1963

3,076,003
PROCESS FOR POLYMERIZING UNSATURATED FATTY ACIDS
Latimer D. Myers, Charles G. Goebel, and Fred O. Barrett, all of Cincinnati, Ohio, assignors to Emery Industries, Inc., Cincinnati, Ohio, a corporation of Ohio
No Drawing. Filed Sept. 22, 1960, Ser. No. 57,645
6 Claims. (Cl. 260—407)

This invention relates to a process for the polymerization of unsaturated fatty acids. More particularly, the invention is directed to an improvement over the method described in U.S. Patent Numbers 2,793,219 and 2,793,220 for the polymerization of monounsaturated and polyunsaturated fatty acids, respectively, in which the acids are heated in the presence of a clay mineral and water, the method hereof consisting in further providing the reaction mixture with a catalytic amount of a soap of a fatty acid and a nitrogenous compound such as ammonia or an amine, to provide a product of improved quality.

As disclosed in said patents, fatty acids of the unsaturated monocarboxylic type having chain lengths up to about 22 carbon atoms are heated in the continuing presence of water and a crystalline clay mineral at temperatures ranging from about 180 to 260° C. for several hours to effect polymerization. A portion of the resulting reaction mixture, usually about 30 to 50% thereof, is made up of non-polymerized (though chemically modified) "monomer" material and after filtering off the clay may, if desired, be vacuum distilled from the polymerized residue. The remaining portion of the product is made up in major portion of so-called "dimer" polymer wherein two molecules of fatty acid are linked to one another to form a dicarboxylic acid. A smaller proportion of the non-monomer residue, usually of the order of 18 to 26% thereof, is made up of the corresponding trimer product, a material which is much less desirable than the dimer for many of the applications to which the residue is put, one such use being in the formation of a polyamide product formed by reacting the acid polymer with one or the other of various alkyldiamines.

The monomer product referred to above, differs in character from the monomeric acids employed as the starting material, said product possessing a branched chain structure and being much more difficult to hydrogenate. It is also characterized by a lower iodine value and a higher content of unsaponifiable constituents and of lactones. These, in general, are undesirable qualities, and it is therefore an important object of this invention to provide a polymerization process which results in the formation of a reaction product the unpolymerized, or monomer portion of which has a relatively high free fatty acid content and iodine value, and which at the same time is more readily hydrogenated than the product heretofore obtained.

A further object of the invention is to provide a process which is productive of a fatty acid polymer product having a larger relative proportion of dimer to trimer than has heretofore been possible using methods described in the literature.

The nature of still other objects of the invention will appear from a consideration of the descriptive portion to follow.

The present invention rests on the discovery that the foregoing objects can be attained by carrying out the polymerization of the fatty acids not only in the continuing presence of water and a clay mineral, in accordance with the method described in the aforesaid Patent Numbers 2,793,219 and 2,793,220, but also in the presence of a catalytic amount of an ammonia soap, i.e. one wherein a fatty acid is linked to a pentavalent nitrogen atom, said atom, in turn, being contained in a nitrogenous compound which is capable of reacting with the acid to form said soap. While these additives are referred to herein as ammonia soaps, said term embraces not only compounds of the type formed by the acid with ammonia, ammonium hydroxide, ammonium carbonate or the like, wherein the remaining nitrogen valencies are satisfied only by hydrogen atoms, but also substituted ammonium salts, e.g., those formed by fatty acids with various amines and other nitrogenous compounds wherein the remaining valencies of the nitrogen atom linked to the carboxyl group may be satisfied in while or in part by various substituted or unsubstituted alkyl, aryl, alkaryl, or aralkyl groups, for example.

The ammonia soap utilized in a practice of this invention may be incorporated in the reaction mixture undergoing polymerization in any convenient fashion. Thus, when preformed it may either be added directly to the mixture or be premixed with the clay mineral or the acid starting materials. It may also be dissolved in the water component of the mixture in those cases where water is added to the mixture in amounts over and above those contained in the clay. The soap may also be formed in situ within the reaction mixture by adding (either to the mixture or to one or more of its respective components) a catalytic amount of a nitrogenous compound capable of reacting, directly or indirectly, in some measure with the fatty acids in the mixture to form a soap under the conditions encountered during polymerization or leading thereto. Thus, in some cases, the soap may already be present as the reaction mixture being heated to reaction temperatures, while in others it is formed as the mixture approaches said temperature ranges. All methods seem equally efficacious.

Good results are obtained with ammonium soaps formed with a wide variety of fatty acids. However, those containing from about 11 to 22 carbon atoms, whether saturated, or unsaturated, are preferred. Representative fatty acids which can be used to form the soap are stearic, palmitic, oleic, linoleic, lauric, erucic, myristic and hendecanoic acids, as well as mixtures of fatty acids derived from tall oil, linseed oil, animal fats, safflower oil, soybean oil, cottonseed oil or corn oil, inter alia, by the practice of applicable splitting, distillation or other technique.

Similarly, as regards the nitrogenous component of the soap, a preferred class of compounds is made up of ammonia, ammonium hydroxide, and alkaline reacting ammonium salts such as ammonium carbonate. Other representative nitrogenous compounds which may be successfully employed in a practice of this invention include ammonium acetate, ammonium benzoate, ammonium azelate, urea, methyl amine, propyl amine, isoamyl amine, decyl amine, dimethyl amine, dipropyl amine, trimethyl amine, triisoamyl amine, ethylene diamine, hexamethylene diamine, phenylene damine, xylylene diamine, diethylene triamine, tetraethylene pentamine, monoethanol amine, triethanol amine, aniline, p-hydroxyaniline, benzyl amine, diphenyl amine, pyrollidine, piperidine, quinoline, tetramethyl ammonium hydroxide and benzyltrimethyl ammonium hydroxide.

In carrying out the polymerization process of this invention, a suitable reaction vessel is charged with the acids to be polymerized, clay mineral, water and the ammonia soap or nitrogenous soap-forming compound. The vessel is then heated to polymerization temperatures, preferably under elevated pressure to retain at least a portion of the water originally present in the reacting mixture.

The process just described may be practiced in the polymerization of all fatty acids and mixtures of fatty acids which contain unsaturated acids having chain lengths of from about 11 to 22 carbon atoms. A mixture of fatty acids as obtained from the separating of tall oil is used in the examples given below, said material representing a typical mixture of fatty acids. It is to be understood, however, that the process may also be practiced with a wide variety of other unsaturated fatty acids or mixtures thereof, including those derived from tallow or other animal fats, rape seed oil, cottonseed oil, linseed oil, soybean oil, corn oil, fish oil and other natural fats and oils, as well as with synthetically prepared unsaturated fatty acids, when available, such as undecylenic acid.

The clay minerals which may be used in the practice of the process of this invention are the commercially abundant, crystalline, surface active clay minerals such as montmorillonite, hectorite halloysite, attapulgite and sepiolite. The commercial bentonites may also be used if they contain sufficient montmorillonite, those containing at least 75% montmorillonite being particularly recommended. The amount of clay employed in the reaction mixture may range from about 1 to 20% of the weight of the fatty acids, though from a practical operating standpoint, a preferred range is from 2 to 6%.

The amount of water incorporated in the reaction mixture usually ranges from about 1 to 5% in terms of the weight of fatty acids present, though good results may be obtained with somewhat lesser amounts, particularly if the free space in the vessel is kept to a minimum. In some cases the water content of the clay itself may be sufficient to promote the reaction. As a conventional practice, water is maintained in the reaction mixture as the same is brought to operating temperatures and maintained thereat, by closing the vessel and allowing steam pressure to build up therein as described in the examples given below. However, other appropriate means, as by the use of a reflux condenser, or the like, may be employed to maintain the water content of the reaction mixture at an operable level.

The amount of ammonia soap to be employed may vary over a relatively wide range varying from extremely small amounts of the order of 0.1% or even less (in terms of the weight of clay mineral present) to those as large as 10 or 20%. The soap, along with the clay mineral and water components, functions as a catalyst, and some soaps are more efficacious than others. Hence the amounts are best defined as those which will effect the desired catalytically-induced reaction. In most instances, however, good results can be obtained by using from about 1 to 15% of the ammonium soap, again in terms of the weight of clay mineral present.

The polymerization may be performed at temperatures ranging from about 180 to 270° C., or even somewhat higher. A practical and preferred temperature range is from about 220 to 250° C. A satisfactory degree of polymerization occurs within a reaction period of from about 2 to 6 hours under these preferred temperature conditions, the recommended practice being to continue the heating until the neutralization equivalent (N.E.) reaches a relatively low and stable level. In general, the use of relatively low reaction temperatures necessitates use of correspondingly longer reaction times, and vice versa. However, the use of unduly high temperatures, while permitting of shorter reaction times, is to be avoided insofar as possible since it may lead to degradation of product.

The following examples are illustrative of the practice of the present invention in various of its embodiments. In each case, the acid starting material employed was a mixture of fatty acids as recovered from tall oil, said mixture having the following specifications:

| | |
|---|---|
| Oleic acid _____percent__ | 51.4 |
| Linoleic acid _____do____ | 44.6 |
| Saturated acids _____do____ | 1.8 |
| Rosin _____do____ | 1.2 |
| Unsaponifiables _____do____ | 1 |
| Iodine value (I.V.) _____ | 132 |
| Neutralization equivalent (N.E.) _____ | 286 |
| Saponification equivalent (S.E.) _____ | 285 |

The clay material employed in each example was Grade 98 Filtrol, as sold by the Filtrol Corporation, said product being a finely powdered montmorillonite mineral having a generl formula of $(MgCa)OAl,SiO_2 \cdot nH_2O$. This clay had a water content of about 15%.

EXAMPLE 1

In this operation 1200 grams of tall oil fatty acids, 48 grams of Grade 98 Filtrol and 24 grams of water were combined with 0.75 gram ammonium hydroxide (1.56% in terms of weight of clay present) and placed in a steel autoclave equipped with a stirrer. The stirred mixture was then heated, steam being vented from the vessel, along with the air contained therein, until a temperature of about 130° C. was reached. The autoclave was then closed and steam pressure allowed to build up therein as the vessel reached and was held at reaction temperature, 240° C. Heating at this temperature, with stirring, was then continued for 4 hours, the pressure having risen from about 115 p.s.i.g. at the start of this period to 130 p.s.i.g. at the end thereof. The contents of the vessel were then cooled to 130° C., treated with 1.8 grams of phosphoric acid (as $H_3PO_4$) and the water present therein flashed off. The treatment with $H_3PO_4$ converted the soap present in the mixture to insoluble ammonium phosphate which was then removed from the mixture, along with the clay, as the product was cooled and filtered. The monomer portion of the reaction mixture was then removed by distillation up to 270° C. under 1–2 mm. Hg abs. The monomer yield was 37.7%, and this portion of the product was found to have an iodine value of 90, a neutralization equivalent of 312 and a saponification equivalent of 296. It contained a total of 9.8% of unsaponifiable materials and lactones. The remaining, non-monomer portion of the product, recovered in a yield of 62.3%, had an iodine value of 119, a neutralization equivalent of 291 and a saponification equivalent of 286. As determined by analytical procedures, it contained 16% of trimer.

A "control" operation was then run in exactly the same manner as described above, except that in this case, the ammonium hydroxide component was omitted. Here the monomer and polymer yields were 34.3% and 65.7%, respectively. Trimer content of the polymer was 19% and it had an iodine value of 105, a neutralization equivalent of 291 and a saponification equivalent of 284. The monomer contained 12.5% of non-free fatty acid materials and had an iodine value of 72, a neutralization equivalent of 322 and a saponification equivalent of 298.

The data presented above are incorporated in the following table which also presents data of corresponding runs made under the same conditions, but with other nitrogenous additives in the amount and kind as shown in the table.

Results Obtained in Polymerization of Tall Oils—240° C., 4 Hours

| Example Number | Nitrogenous additive and amount | Polymer product | | | | | Monomer product | | | | |
|---|---|---|---|---|---|---|---|---|---|---|---|
| | | Percent Yield | Trimer content, Percent | I.V. | N.E. | S.E. | Percent Yield | Non-free fatty acid content, percent [1] | I.V. | N.E. | S.E. |
| Control | None | 65.7 | 19 | 105 | 291 | 284 | 34.3 | 12.5 | 72 | 322 | 298 |
| 1 | Ammonium Hydroxide, 0.66 gm | 62.3 | 16 | 119 | 291 | 286 | 37.7 | 9.8 | 90 | 312 | 296 |
| 2 | Trimethyl Amine, 1.11 gms | 54.5 | 16 | 136 | 305 | 292 | 45.5 | 7.0 | 99 | 303 | 291 |
| 3 | Pyridine, 1.5 gms | 48.4 | 15 | 143 | 300 | 293 | 51.6 | 4.3 | 106 | 296 | 291 |
| 4 | Pyridine, 0.75 gm | 63.2 | 14 | 126 | 290 | 287 | 36.8 | 11.5 | 83 | 319 | 298 |
| 5 | Urea, 0.56 gm | 52.1 | 13 | 116 | 297 | 290 | 47.9 | 5.5 | 100 | 299 | 293 |
| 6 | Ethylene Diamine, 0.56 gm | 45.0 | 12 | 115 | 305 | 294 | 55.0 | 3.5 | 103 | 293 | 292 |
| 7 | Ethylene Diamine (250° C.), 0.56 gm | 46.0 | | 95 | 303 | 292 | 54.0 | 4.3 | 104 | 296 | 292 |
| 8 | Tetramethyl Ammonium Hydroxide | 55.0 | | 110 | 299 | 287 | 45.0 | 7.0 | 94 | 303 | 293 |

[1] Total percent of unsaponifiable material+lactones.

It is obvious from the data presented in the table above that use of reaction mixtures containing an ammonia soap gives a product of much higher quality than that obtained when said soap is omitted. Thus, the polymer product is found to be characterized by a relatively low content of the undesirable trimer component, while the monomer portion of the product is generally low in non-free fatty acid components and has I.V., N.E. and S.E. values which are much closer to that of the original starting materials than is otherwise the case.

The non-metallic ammonia soaps described herein are members of the broader class consisting of fatty acid soaps of an alkali material. Other members falling within this broader class (e.g., soaps of an alkali metal or of an alkaline earth metal) give results generally equivalent to those obtained with ammonia soaps insofar as concerns increasing the ratio of dimer to trimer in the polymer and improving the quality of the monomer portion of the product, the use of such metal soaps being covered in our copending application, Serial No. 835,430, filed August 24, 1959, now U.S. Patent No. 2,955,121. However, use of the ammonia soaps leads to improved processing results not obtained when the soap used is one of a metal. Polymers of the type produced hereby are widely used in the manufacture of various polyesters, polyamides, surface coatings, urethane foams, rust inhibitors and synthetic lubricants. The monomers (and to a certain extent the whole reaction product, as well) are used in forming emulsifying agents of one kind or another. While for many of these uses the presence in the monomer or polymer product of a metallic soap is disadvantageous, this is not the case with the ammonia soaps, the latter actually proving to be beneficial in some product applications. On the other hand, when it is desired to provide a product which is free of the ammonia soap, removal thereof can be accomplished by acidulating the polymerized reaction mixture with an acid (phosphoric, oxalic, citric or sulfuric, for example) adapted to convert soap present in the mixture to free acid and a substantially fatty acid-insoluble salt, the salt then being filtered off from the mixture, usually in conjunction with the clay.

Having described our invention, we claim:

1. In a process wherein polymerization of unsaturated fatty acids is effected by heating said acids in the continuing presence of minor proportions of surface-active crystalline clay mineral and of water, the improvement which comprises incorporating in the reaction mixture a catalytic amount of a nitrogenous compound capable of reacting in some measure with the fatty acids in the mixture to form an ammonia soap.

2. In a process wherein polymerization of unsaturated fatty acids is effected by heating said acids in the continuing presence of minor proportions of surface-active crystalline clay mineral and of water, the improvement which comprises incorporating in the reaction mixture a catalytic amount of an ammonia soap.

3. The method of claim 2 wherein the soap is one of a fatty acid and a nitrogenous compound selected from the group consisting of ammonia, ammonium hydroxide and alkaline reacting ammonium salts.

4. The method of claim 2 wherein the ammonia soap is one of a fatty acid and an amine.

5. The process of polymerizing unsaturated fatty acids which comprises heating at temperatures of from about 180–270° C., a reaction mixture comprising unsaturated fatty acids, a minor proportion of a surface-active, crystalline clay mineral, a minor proportion of water and a catalytic amount of an ammonia soap, said heating being continued for a period sufficient to effect an appreciable polymerization of the fatty acids.

6. The process of claim 5 wherein there are added the steps of acidulating the polymerized reaction mixture with an acid adapted to convert soap present therein to free acid and a substantially fatty acid-insoluble salt; and removing clay mineral and salt from the acidulated mixture.

References Cited in the file of this patent

UNITED STATES PATENTS

| 2,417,738 | De Groote | Mar. 18, 1947 |
| 2,478,451 | Berger et al. | Aug. 9, 1949 |
| 2,955,121 | Myers et al. | Oct. 4, 1960 |